(12) United States Patent
Webb et al.

(10) Patent No.: US 6,327,058 B1
(45) Date of Patent: Dec. 4, 2001

(54) METHOD AND APPARATUS FOR INCLUDING AN AUXILIARY IMAGE IN A SCANNED IMAGE

(75) Inventors: Steven L. Webb, Loveland; Kevin J. Youngers, Greeley; Michael D. Erickson, Ft. Collins, all of CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/049,421

(22) Filed: Mar. 27, 1998

(51) Int. Cl.$^7$ ..................................................... H04N 1/04
(52) U.S. Cl. ........................................... 358/497; 358/474
(58) Field of Search ............................... 358/487, 506, 358/505, 450; 382/212; 380/54

(56) References Cited

U.S. PATENT DOCUMENTS 5,907,411 * 5/1999 Han ........................................ 358/487

FOREIGN PATENT DOCUMENTS

| 41 30 803 A1 | 3/1993 | (DE) | B43M/17/00 |
|---|---|---|---|
| 0 167 359 | 1/1986 | (EP) | H04N/1/00 |
| 0 784 396 A2 | 7/1997 | (EP) | H04N/1/409 |
| 01040872 | 2/1989 | (JP) | G03G/15/22 |
| 04293356 | 10/1992 | (JP) | H04N/1/387 |
| 90 03277 | 4/1990 | (WO) | B42D/15/00 |
| WO 90/03277 * | 4/1990 | (WO) | B42D/15/00 |

* cited by examiner

*Primary Examiner*—Cheukfan Lee
(74) *Attorney, Agent, or Firm*—Steven L. Webb

(57) ABSTRACT

An apparatus having an image behind a document to be scanned on an optical image scanner, copier, facsimile machine or similar device. The image behind the document would partially bleed-through into the reproduced image, leaving a faint replica of the auxiliary "bleed-through" image in the reproduced image.

3 Claims, 2 Drawing Sheets

METHOD AND APPARATUS FOR INCLUDING AN AUXILIARY IMAGE IN A SCANNED IMAGE

FIELD OF THE INVENTION

This invention relates generally to scanners, copiers, facsimile machines and other devices used for transforming an optical image of a document into a electronic signal and more specifically to holding an auxiliary image in place such that the auxiliary image intentionally is included in and added to the electronic signal.

BACKGROUND OF THE INVENTION

Electronic document scanners, copiers, and facsimile machines transform an optical image of a document into an electric signal suitable for storing, displaying, printing or electronic transmission. There is a need to mark certain documents with an "electronic watermark." An electronic watermark is any auxiliary image that will he added to die electronic copy of the original document. The electronic watermark could be a company name or symbol, or it could be information used to track which scanner, copier, or facsimile machine was used to create the reproduction or it could be the name of the person creating the reproduction.

SUMMARY OF THE INVENTION

An auxiliary image or symbol is positioned on a scanner, copier, or facsimile machine such that the auxiliary image or symbol intentionally is included in and added to the electronic version of the document being reproduced. In an example embodiment, an apparatus has a holder to position the auxiliary image or symbol onto the document that will be converted into electronic form. The holder allows the auxiliary image or symbol to be easily changed or removed.

DETAILED DESCRIPTION OF THE PREFERRED EMBODIMENT

An auxiliary image or symbol is positioned on a scanner, copier, or facsimile machine such that the auxiliary image or symbol is added to the electronic version of the document being reproduced. The auxiliary image could be any information that the user wants to include in the reproduced images. For example, the company trademark could be inserted such that each reproduced image would include the company trademark for advertisement or for tracking purposes.

Documents to be scanned may generally be classified as either transparent or opaque. For opaque documents, light is reflected off an image on the surface of the document onto a photosensitive transducer, typically a photoconductive drum or an array of photosensitive sensor elements. However, documents are rarely completely opaque. In a typical device, some light passes through the document to a secondary reflective surface, for example a lid or automatic document feeder. Some light then reflects off the secondary reflective surface and passes back through the document a second time. The light that passes through the document twice may also be detected by the photosensitive transducer. When there is a second image placed above or behind the first document the second image may be partially imaged onto the photosensitive transducer.

Figure 1:
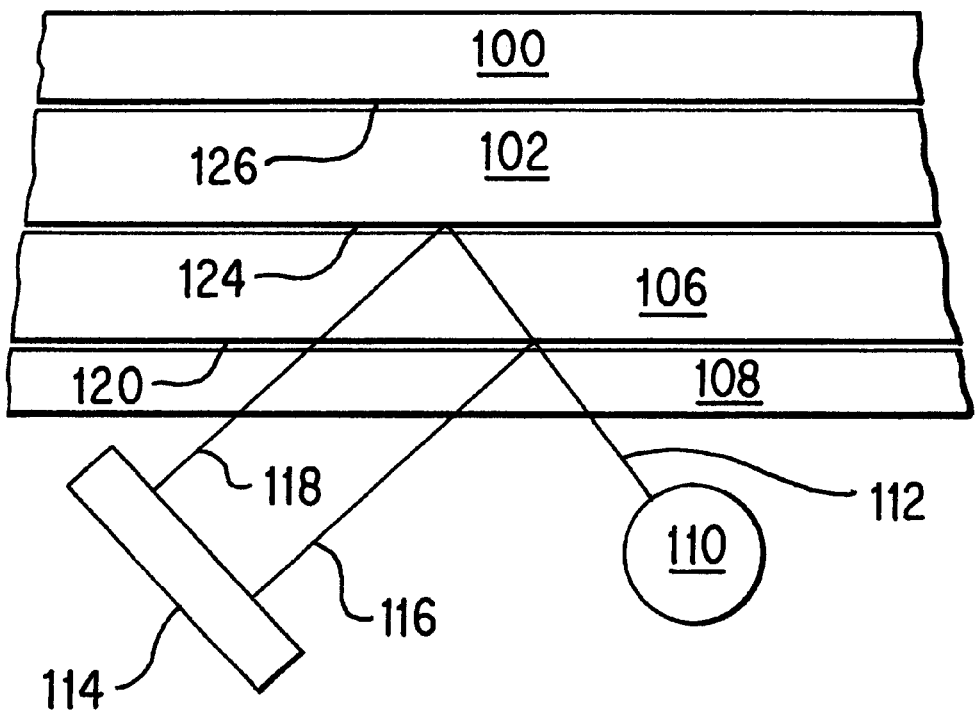
FIG. 1 is a cross section of an imaging device including an auxiliary image and a secondary reflective surface.

FIG. 1 illustrates a document 106, laying face down on a transparent platen 108, with a lid or automatic document feeder 100. The document 106 has an image on a front face 120. The lid or automatic document feeder 100 provides a secondary reflective surface 126. A lamp 110 provides light rays 112. Most of the light rays 112 reflect off the front face 120 of the document 106, generating front reflected light rays 116. Some of the light rays 112 pass through the document 106, and reflect off of the auxiliary image surface 124, passing back through the document 106, generating secondary reflected light rays 118. Both light rays 116 and 118 are received and transformed by a photosensitive transducer 114. Transducer 114 may be a photosensitive drum or an array of photosensitive elements or a single light beam may be scanned and reflected onto a single sensor. The figure is simplified in that scanning devices typically include lenses, mirrors and other optical components not relevant to the invention.

Reflected light 118 will have a faint image of what was on the surface 124 of the auxiliary image. The intensity of the image will be dependent on the intensity or contrast of the image on surface 124, and the thickness or opaqueness of the document 106. The larger the differences between the dark areas and light area on the auxiliary image 102, and the thinner or more transparent document 106, then the more apparent the auxiliary image will be in the reproduced image.

Figure 2:
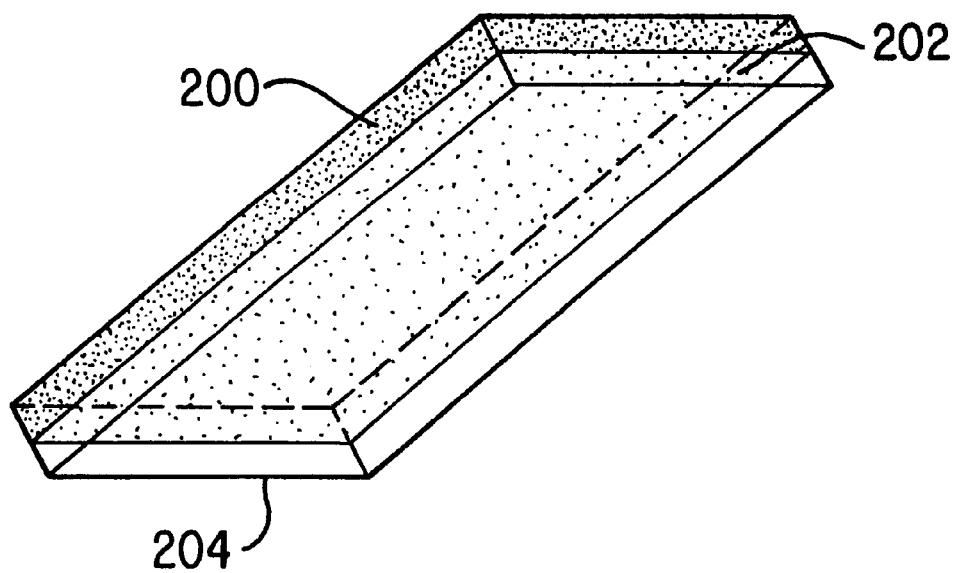
FIG. 2 is a perspective view of a secondary reflective surface with a transparent material forming a pocket.
Figure 3:
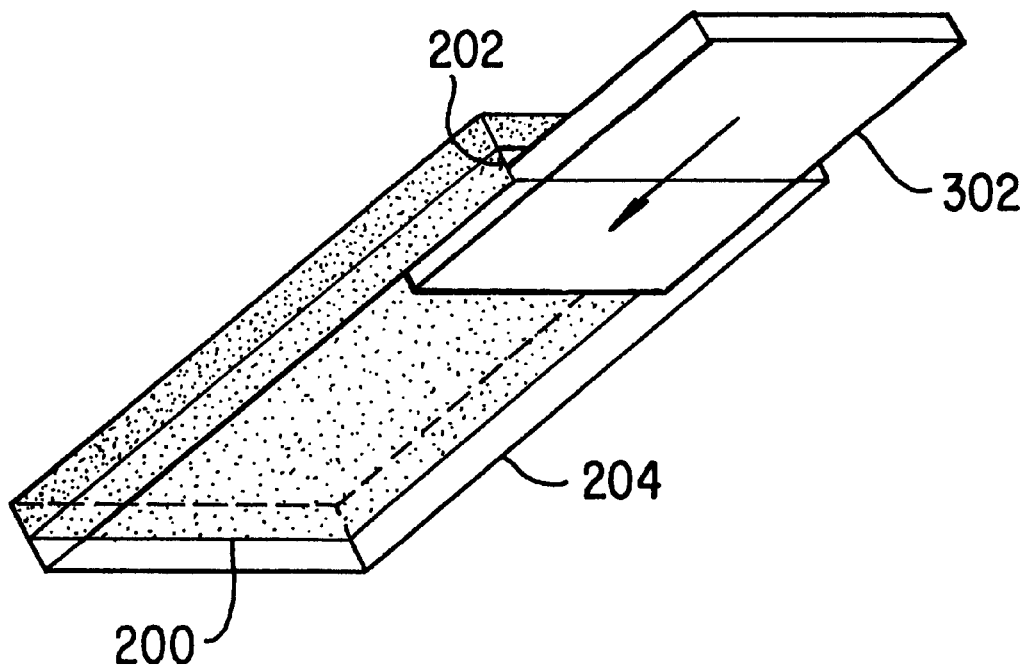
FIG. 3 is a perspective view of a copy of the auxiliary image partially inserted into the pocket formed by the transparent material and the secondary reflective surface.

FIG. 2 shows a secondary reflective surface 200, covered by a transparent material 204, that forms a pocket or slot 202, in which an auxiliary image can be placed. The auxiliary image will be placed such that it will intentionally add to and be included into the final electronic image formed by the device. FIG. 3 shows the secondary reflective surface 200, and the transparent material 204, with the auxiliary image 302, shown partially inserted into the pocket or slot 202. In actual operation the auxiliary image 302, would be fully inserted into the pocket or slot 202.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A device for electronically transforming an image into an electrical signal, the device comprising:

a photosensor;

an area configured to receive a document, the document having a front side and a back side, the back side being opposite the front side, the document being substantially opaque;

a first image located on the front side of the document, the front side of the document facing the photosensor;

a first surface facing the photosensor and behind the document, the first surface having a second image whereby the second image on the first surface is electronically transformed by the device, through the document, when electronically transforming the first image.

2. The device of claim 1, where the first surface having the second image is removably held adjacent to the back side of the document.

3. The device of claim 1, where the first surface having the second image is removably held adjacent to the back side of the document by a transparent material that forms a pocket that holds the first surface.

\* \* \* \* \*